United States Patent [19]
Kori et al.

[11] Patent Number: 5,587,849
[45] Date of Patent: Dec. 24, 1996

[54] MECHANISM FOR SECURING RECORDED CONTENTS OF RECORDING MEDIUM CASSETTE

[75] Inventors: Teruhiko Kori; Hiroshi Yamazaki, both of Kanagawa; Harumi Kawamura, Tokyo; Hisato Shima, Chiba; Kazuyuki Ogawa, Kanagawa, all of Japan

[73] Assignee: Sony Corporation, Tokyo, Japan

[21] Appl. No.: 502,467

[22] Filed: Jul. 14, 1995

Related U.S. Application Data

[63] Continuation of Ser. No. 140,259, Oct. 21, 1993, abandoned.

[30] Foreign Application Priority Data

Oct. 22, 1992 [JP] Japan ..................... 4-284706

[51] Int. Cl.⁶ .................... G11B 15/18; G11B 17/00; G11B 11/02; G11B 27/36
[52] U.S. Cl. .................... 360/69; 369/54; 369/58
[58] Field of Search ................ 360/60, 72.1, 133, 360/13, 48, 31; 369/54, 58, 75.2, 77.2, 100

[56] References Cited

U.S. PATENT DOCUMENTS

| | | | |
|---|---|---|---|
| 3,723,666 | 3/1973 | Ferrari | 360/72.1 |
| 4,338,644 | 7/1982 | Staar | 360/69 X |
| 4,383,285 | 5/1983 | Staar | 360/132 |
| 4,426,684 | 1/1984 | Sechet et al. | 360/13 X |
| 4,866,693 | 9/1989 | Odawara et al. | 369/75.2 |
| 4,896,312 | 1/1990 | Odawara et al. | 369/77.2 |
| 4,903,159 | 2/1990 | Kawano | 360/132 |
| 5,079,651 | 1/1992 | Tsuchida et al. | 360/72.2 |
| 5,091,815 | 2/1992 | Suzuki | 360/133 |
| 5,121,269 | 6/1992 | Tsuchida et al. | 360/72.2 |
| 5,184,342 | 2/1993 | Ishii | 369/100 |
| 5,291,346 | 3/1994 | Baekgaard | 360/60 |
| 5,369,532 | 11/1994 | Dodt et al. | 360/48 |

FOREIGN PATENT DOCUMENTS

| | | |
|---|---|---|
| 594450 | 4/1994 | European Pat. Off. |
| 8910615 | 11/1989 | WIPO |
| WOA8910615 | 11/1989 | WIPO |
| WOA9102355 | 2/1991 | WIPO |
| W0A9314501 | 7/1993 | WIPO |

*Primary Examiner*—Aristotelis Psitos
*Assistant Examiner*—Patrick Wamsley
*Attorney, Agent, or Firm*—Jay H. Maioli

[57] ABSTRACT

A recorded data securing mechanism secures data recorded on a recording medium cassette provided with a memory and a data recording enable/disable tab at a predetermined position on the cassette. Breaking the recording enable/disable tab provided on the memory-based recording medium cassette prevents data recorded on the cassette from being written over and ensures that there will be no mismatch between the recording information stored in the memory of the cassette and the data recorded on the recording medium of the cassette. In one embodiment, rewriting is enabled but a memory mismatch flag is set if rewriting results in a mismatch.

2 Claims, 15 Drawing Sheets

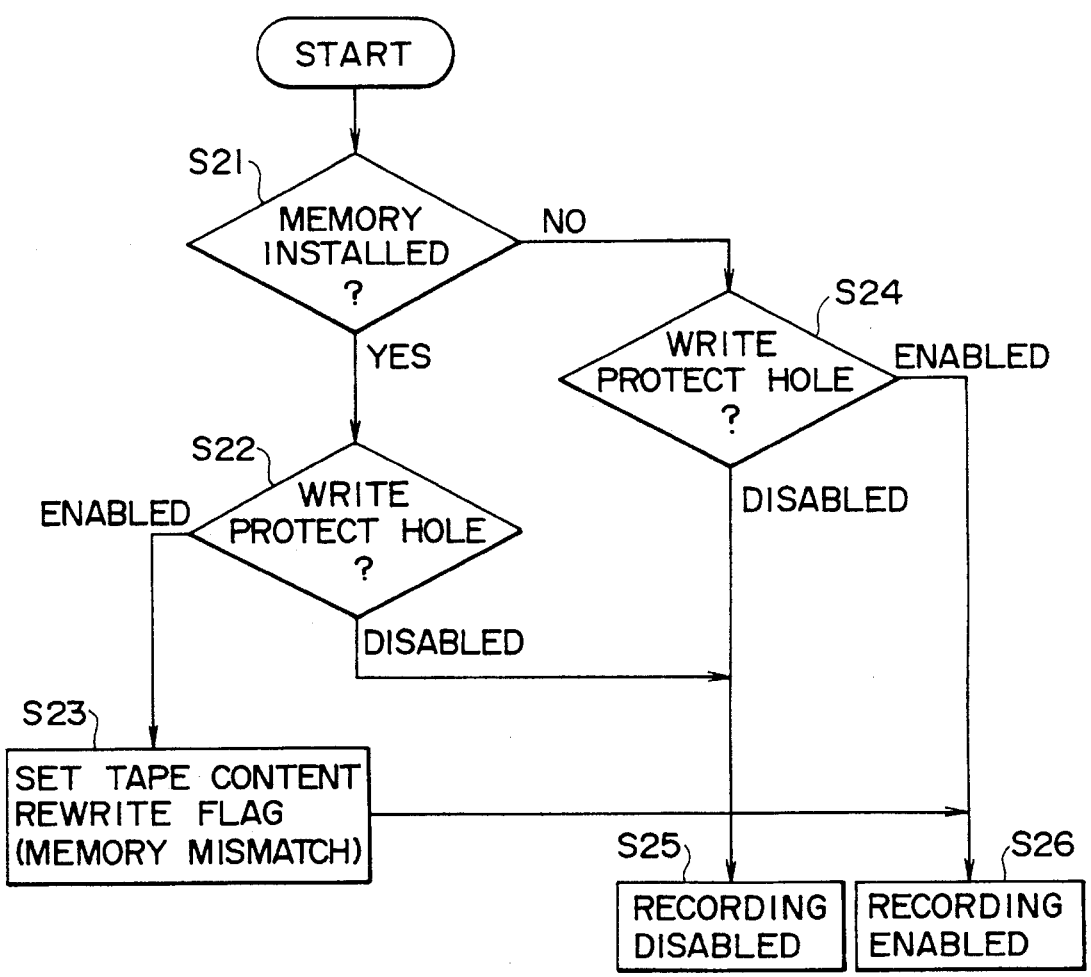
F I G. 12

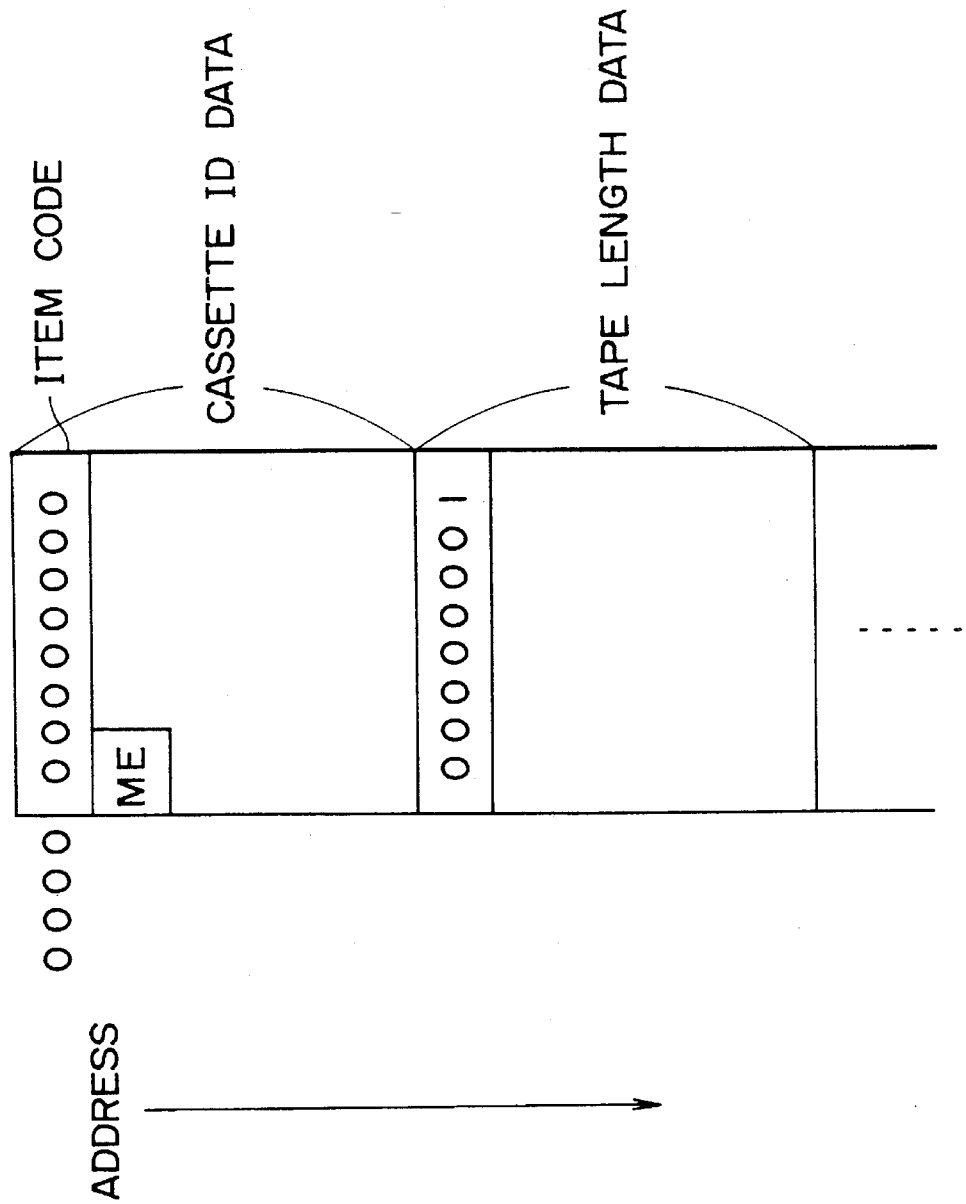

MECHANISM FOR SECURING RECORDED CONTENTS OF RECORDING MEDIUM CASSETTE

This is a continuation of application Ser. No. 08/140,259 filed Oct. 21, 1993, now abandoned.

BACKGROUND OF THE INVENTION

1. Field of the Invention

The present invention relates to a mechanism for securing recorded contents of a recording medium cassette whether or not it has a memory and, more particularly, to a mechanism for ensuring that recording information stored in the memory of the recording medium cassette always matches contents recorded on a recording medium of a recording medium cassette.

2. Description of the Prior Art

A variety of recording medium cassettes having memory have been proposed. See for example a patent to Staar U.S. Pat. No. 4,338,644 for "Magnetic Tape Cassettes Provided with Memory Circuits for Storing Information," issued Jul. 6, 1982. Such cassettes are often referred to as MIC cassettes (MIC is an acronym for "memory in cassette"). If these memory-based recording medium cassettes are put in the market, there will be both types of recording medium cassettes at the same time: memory-based type and non-memory type.

At the same time, there will be both types of recording/reproducing apparatus: one compatible with a memory-based recording medium cassette and the other incompatible with a memory-based recording medium cassette. Possible combinations of these cassettes and recording/reproducing apparatus will be as shown in Table 1.

TABLE 1

| Recording medium cassette | Recording/reproducing apparatus | |
|---|---|---|
| | For memory | Not for memory |
| With memory | A | B |
| Without memory | C | C |

The memory installed on a recording medium cassette stores character information about contents recorded on the cassette as well as other information such as recording time and date. It is therefore essential that there exist a correlation between the information stored in the memory and the contents recorded on the cassette. However, in a situation where there are a recording/reproducing apparatus suitable for a memory-based recording medium cassette and a recording/reproducing apparatus not suitable for such a cassette at the same time as shown in Table 1 above, there is a possibility, as described below, that the contents recorded on the cassette will not correspond to the recording information stored in the memory.

"A" in Table 1 is the combination of a memory-based recording medium cassette and a recording/reproducing apparatus suitable for such a cassette. As FIG. 14 shows, there exists a complete match between contents 15a, 15b, 15c, 15d and 15e recorded on a recording medium 15 of the recording medium cassette and information 16a, 16b, 16c, 16d and 16e stored in a memory 16 of the recording medium cassette. Thus, there is no problem in retrieving desired data.

"B" in Table 1 is a combination between a memory-based recording medium cassette and a recording/reproducing apparatus incompatible with such a cassette. Referring to FIG. 15, there may not be a complete correlation between contents 17a, 17b, 17c, 17f and 17g recorded on a recording medium 17 and the information 16a, 16b, 16c, 16d and 16e stored in the memory 16. That is, since this recording/reproducing apparatus is incompatible with the memory, recorded contents 17f and 17g do not match the information 16d and 16e stored in the memory.

"C" in Table 1 is the combination of a recording medium cassette without a memory and a recording/reproducing apparatus compatible with a memory or a recording/reproducing apparatus incompatible with a memory. In this case, there is no problem of a mismatch between recorded contents and recording information. As FIG. 16 shows, since no memory is provided, the recording/reproducing apparatus does not know the start point of 18e.

Thus, if a recording medium cassette with a memory and a recording medium cassette without a memory exist together and, additionally, a recording/reproducing apparatus compatible with the recording medium cassette with the memory and a recording/reproducing apparatus incompatible with such a cassette exist together, there is always a chance of a mismatch between the information stored in the memory of a recording medium cassette and the contents recorded on the recording medium of a recording medium cassette. In that case, if a recording medium cassette having such a mismatch is used on the memory-compatible recording/reproducing apparatus and the contents in the memory are read, the mismatch causes confusion in a data retrieval operation, and the value added by the memory is lost.

Besides, there are two conventional types of mechanisms for protecting information recorded on a video tape cassette. One, employed on video tape cassettes of VHS type and Beta type, uses a protection tab removably attached on the rear or bottom side of the cassette. Normally, a write protect opening provided on the rear or bottom side of the cassette is closed with this tab, enabling the writing of data on the magnetic tape. When this tab is removed, the write protect opening is exposed to prevent a data write operation.

The other, employed on a video tape cassette of 8-mm type, uses a slidable tab on the rear side of the cassette. The tab slides over a write protect opening provided in the bottom of the cassette to close the opening, thereby enabling a write operation. When the tab slides in the other direction, it exposes the opening and protects recorded data from being erased or overwritten.

OBJECTS AND SUMMARY OF THE INVENTION

An object of the present invention is to provide a mechanism for securing contents recorded on a recording medium cassette having a memory and a recording medium cassette having no memory and, particularly, a mechanism for ensuring a correlation between information stored in the memory and contents recorded on a recording medium of the cassette.

In the above-mentioned mechanism, if a recording medium cassette with a memory and a recording medium cassette without a memory exist together and, additionally, a recording/reproducing apparatus compatible with the memory-based recording medium cassette and a recording/reproducing apparatus incompatible with it exist together, there is always a correlation between the recording information stored in the memory of the recording medium cassette and data recorded on the recording medium of the recording medium cassette.

In implementing the above-mentioned mechanism, the present invention is practiced as two groups of preferred embodiments.

In one group of preferred embodiments, when a memory-based recording medium cassette has been loaded in a recording/reproducing apparatus incompatible with such a cassette, data recording is forcibly disabled.

In the other group of preferred embodiments, when the memory-based recording medium cassette has been loaded in the recording/reproduced apparatus incompatible with such a cassette, data recording is enabled but a flag is stored in the memory to indicate that there is a mismatch between the recording information stored in the memory and the data recorded on the cassette.

BRIEF DESCRIPTION OF THE DRAWINGS

The above and other objects, features and advantages of the present invention will become more apparent from the following description taken in connection with the accompanying drawings, in which:

FIG. 12 is a flowchart illustrating an operation to be performed when the memory-based recording medium cassette is loaded in the recording/reproducing apparatus incompatible with a cassette of the type shown in FIG. 10;

FIG. 19 is a diagram of bits recorded in a cassette memory, including an ME bit which indicates (for example if the ME bit is "0") that the tape was recorded by a MIC limited function VCR OR (for example if the ME bit is "1") that the tape was recorded by an MIC function and full function VCR.

DESCRIPTION OF THE PREFERRED EMBODIMENTS

A mechanism for securing the contents recorded on a recording medium cassette according to this invention is described below with reference to the drawings.

In a first embodiment of the invention, a write protect hole of the recording medium cassette is used for implementing the recorded content securing mechanism. As shown in Table 2 below, a recording medium cassette with memory and a recording medium cassette without memory are different with respect to the construction of a tab that covers the write protect hole provided on each of these cassettes. In addition, they are different with respect to the recorded content securing mechanism depending on whether or not a recording/reproducing apparatus on which they are operated is compatible with the memory-based cassette. The securing mechanism is described below with reference to Table 2 for each combination of recording medium cassette and recording/reproducing apparatus.

TABLE 2

| Recording medium cassette | Recording/reproducing apparatus | |
|---|---|---|
| | For memory | Not for memory |
| With memory | Removable tab | Removable tab + memory |
| Without memory | Slidable tab | Slidable tab |

(1) MIC cassette with memory in combination with VCR deck for MIC

Figure 1A:
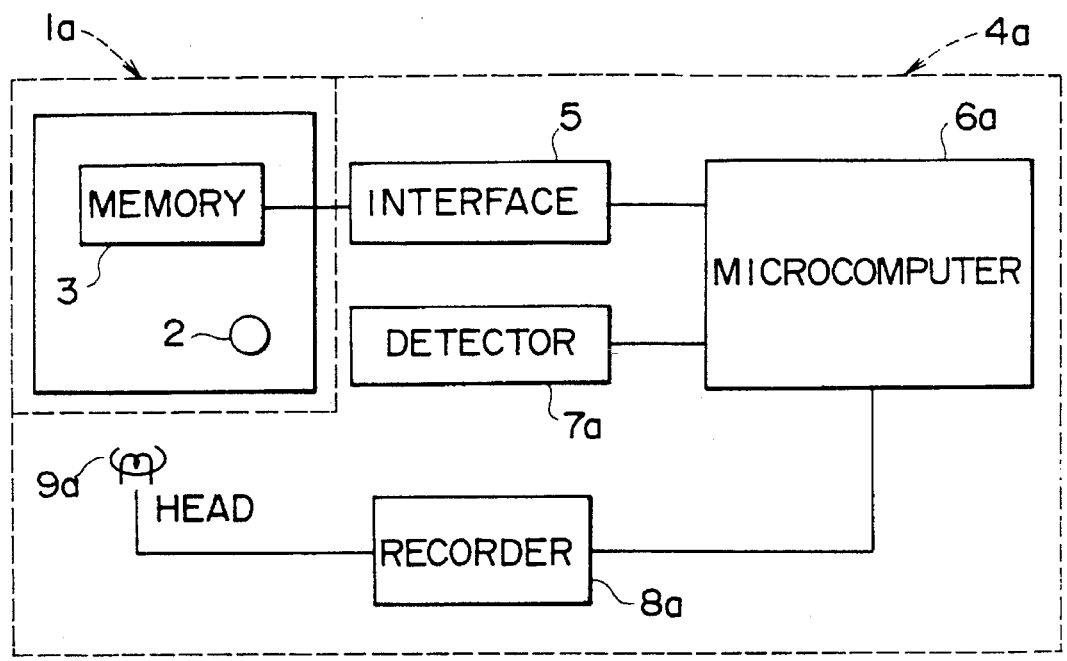
FIGS. 1(a) and 1(b) are respectively block diagrams illustrating relationships between a memory-based recording medium cassette and recording/reproducing apparatuses practiced as a first preferred embodiment of the present invention.

FIG. 1(a) shows, a recording/reproducing apparatus 4a compatible with a memory-based recording medium cassette 1a and comprising a recorder 8a for recording data on a recording medium of the recording medium cassette 1a by means of a head 9a, an interface 5 for supplying power to a memory 3 in the recording medium cassette 1a, a microcomputer 6a for reading/writing information on the memory 3, and a detector 7a for determining the state of a write protect hole 2 provided on the recording medium cassette 1a. The recording medium cassette has terminals for communication with the recording/reproducing apparatus 4a.

(2) MIC cassette in combination with VCR deck for IDB

FIG. 1 (b) shows a recording/reproducing apparatus 4b incompatible with the memory-based recording medium cassette 1a and comprising a recorder 8b for recording data on a recording medium of the recording medium cassette 1a by means of a head 9b, a detector 7b for determining the state of the write protect hole, and a microcomputer 6b for controlling recording means based on a detection result obtained from the detector 7b.

Figure 1B:
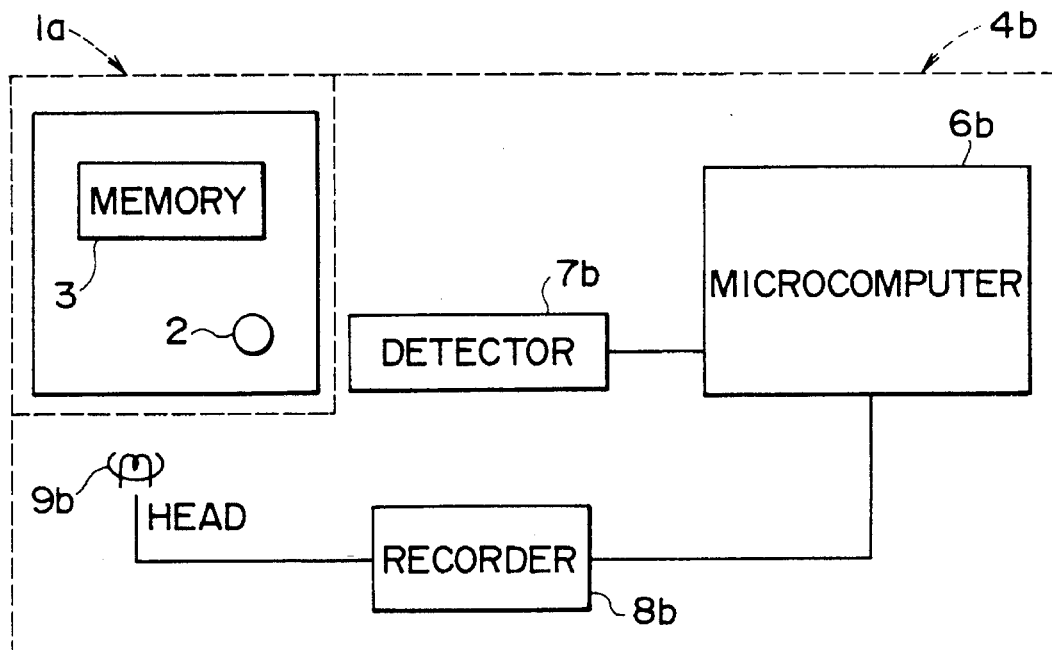

As FIGS. 1(a) and 1(b) show, the memory-based recording medium cassette 1a comprises the memory 3 for storing information about the contents recorded on the recording medium of the recording medium cassette and the write protect hole 2 for ensuring protection of data recording.

Figure 2:
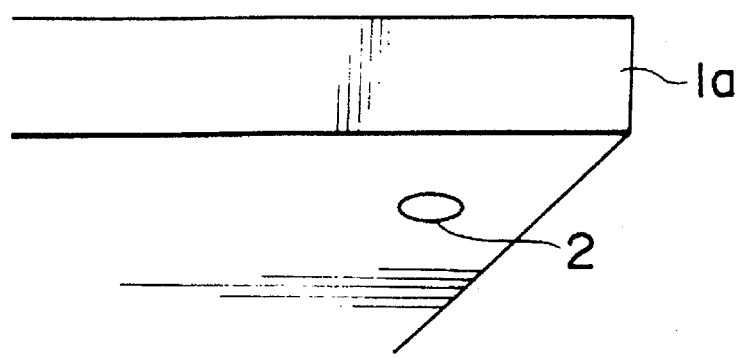
FIG. 2 is a diagram illustrating enabling/disabling means for enabling/disabling data recording on the memory-based recording medium cassette of FIG. 1.

As FIG. 2 shows, the write protect hole 2 of the memory-based recording medium cassette 1a is opened or exposed from the beginning: i.e., when the cassette is shipped from the factory.

When the memory-based recording medium cassette 1a is loaded in the recording/reproducing apparatus 4a compatible with memory, the microcomputer 6a is activated to determine whether or not the recording medium cassette is provided with memory. If the cassette is found to have a memory, then the microcomputer 6a reads information from the memory. The memory stores a flag for enabling/disabling data recording. From the state of the flag, the microcomputer 6a determines whether or not data can be recorded on the recording medium of the cassette. Thus, a part of the recording medium can be write-protected while other parts are enabled for data writing.

Meanwhile, when the recording medium cassette 1a having a memory is loaded in the recording/reproducing apparatus 4b incompatible with memory, the microcomputer 6b determines whether or not the recording medium cassette is provided with memory. If the cassette is found to have a memory, then the microcomputer 6b detects the write protect hole of the cassette by means of the detector 7b. Since the write protect hole is open, the microcomputer 6b determines that the cassette is write-protected.

(3) IDB cassette in combination with VCR deck for MIC

Figure 3:
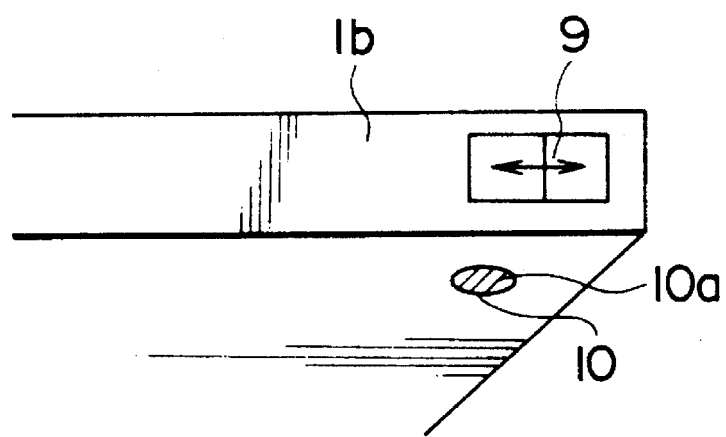
FIG. 3 is a diagram illustrating enabling/disabling means for enabling/disabling data recording on a recording medium cassette having no memory.

FIG. 3 shows a recording medium cassette 1b provided with no memory and having a slidable lug 9 in a corner of a side of a cassette case accommodating the recording medium and a write-protect hole 10 covered with a slidable tab 10a operatively associated with the slidable lug 9.

When the recording medium cassette 1b provided with no memory is loaded in the recording/reproducing apparatus 4a compatible with the memory-based cassette or the recording/reproducing apparatus 4b incompatible with the memory-based cassette, the microcomputer detects the state of the slidable tab 10a, that is, whether or not it covers the write-protect hole, to determine whether or not the cassette is write-protected.

To be specific, when the write-protect hole is closed with the slidable lug 9 at the position of the slidable tab 10a, recording is enabled; when the write-protect hole is open, recording is disabled.

Thus, the method of enabling/disabling the writing of data on the recording medium differs depending on whether (a) the recording medium cassette 1a (FIG. 2) provided with memory is loaded into the recording/reproducing apparatus 4a compatible with a memory-based cassette or into the recording/reproducing apparatus 4b incompatible with the memory-based cassette, or (b) the recording medium cassette 1b (FIG. 3) lacking memory is loaded into one of these apparatuses.

Figure 4A:
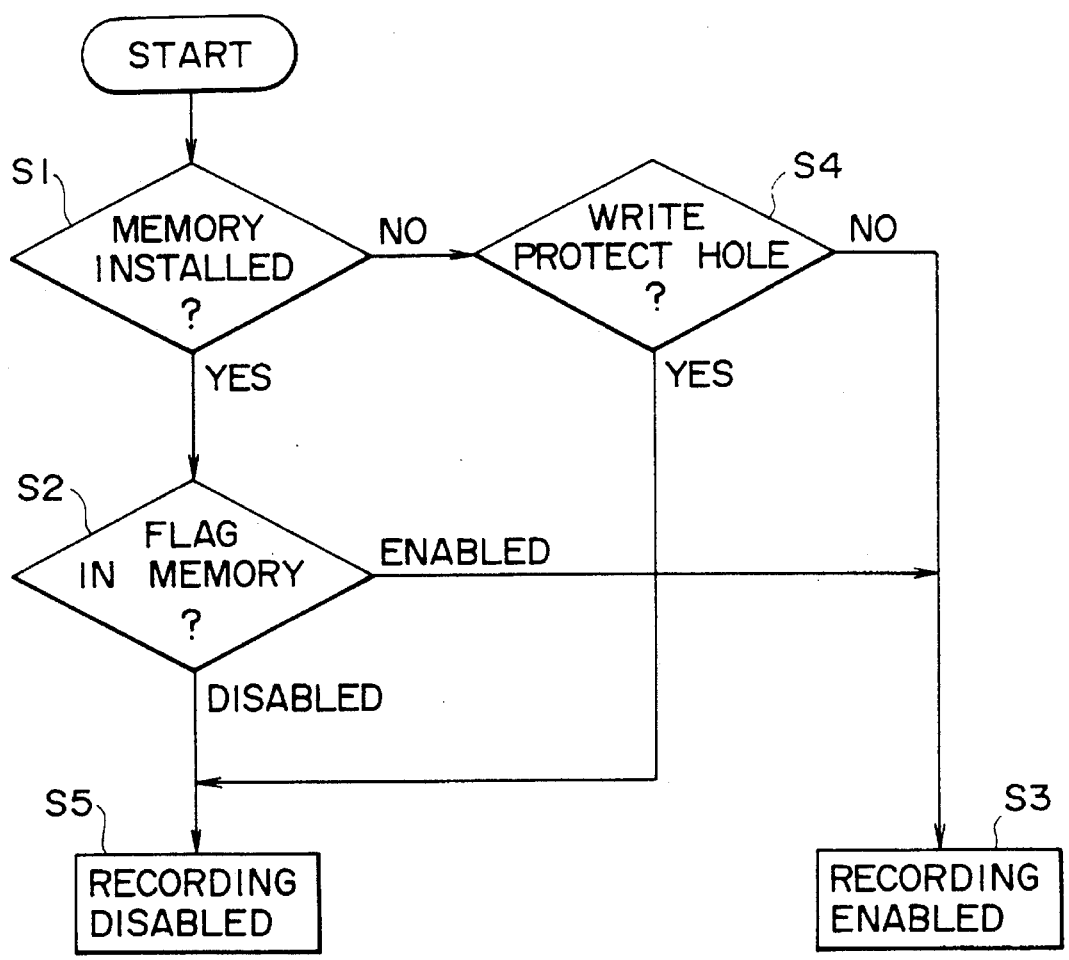
FIGS. 4(a) and 4(b) are flowcharts illustrating operations to be performed when the memory-based recording medium cassette and the cassette having no memory are loaded in the recording/reproducing apparatus compatible with the memory-based recording medium cassette and the recording/reproducing apparatus incompatible with such a cassette.

That is, as FIG. 4(a) shows, the recording/reproducing apparatus 4a compatible with the memory-based cassette first determines whether or not a loaded cassette has memory (step S1). The determination is made for example by sending a data read instruction. If data is returned in response to the instruction, it is determined that the recording medium cassette is provided with memory. If no data is returned, it is determined that the cassette is provided with no memory. If the cassette is the recording medium cassette 1 provided with memory, the recording/reproducing apparatus 4a extracts from the memory a recording disable/enable flag (step S2). If the flag is found to disable data recording, the recording/reproducing apparatus 4a determines that the recording of data on the cassette is disabled (step S5); if the flag is found enabling, the apparatus determines that the recording of data on the cassette is enabled (step S3).

If the cassette is found to have no memory, the recording/reproducing apparatus 4a checks whether or not the write-protect hole has been detected (step S4). If the write-protect hole has been found, data recording is disabled (step S5); otherwise, data recording is enabled (step S3).

Figure 4B:
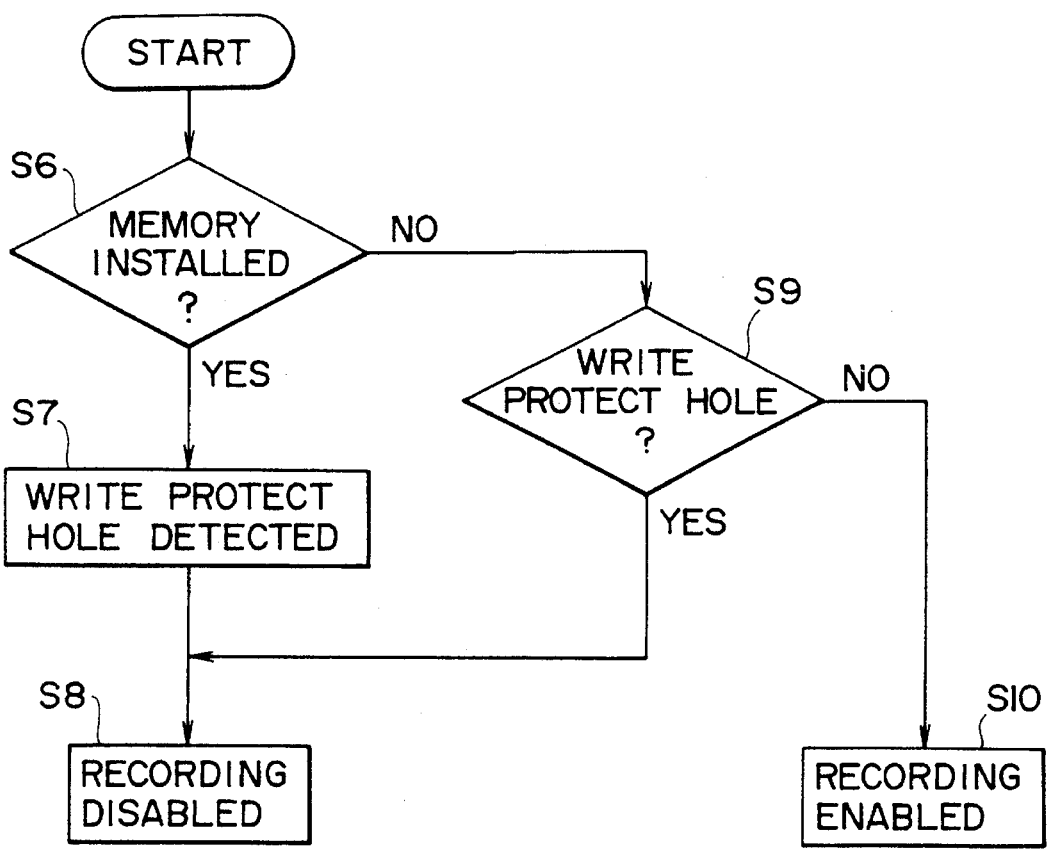

In FIG. 4(b), the recording/reproducing apparatus 4b incompatible with the memory-based recording medium cassette checks a loaded cassette for memory (step S6) and checks a state of the write-protect hole of the cassette (step S9). If the loaded cassette is found having no memory and its write-protect hole is found open, data writing is disabled (step S8); if the write-protect hole is found closed, data recording is enabled (step S10). In the case of a memory-based recording medium cassette (a "yes" answer at step S6), its write-protect hole is open (step S7), so that data recording is automatically disabled (step S8). Consequently, there is always a correlation between the contents recorded on the recording medium of the cassette and the recording information stored in its memory.

In a second embodiment of the invention, means for determining whether a recording medium cassette is provided with memory or not is provided separately. For ease of understanding, elements shown in the first embodiment are assigned the same reference numerals.

Figure 5A:
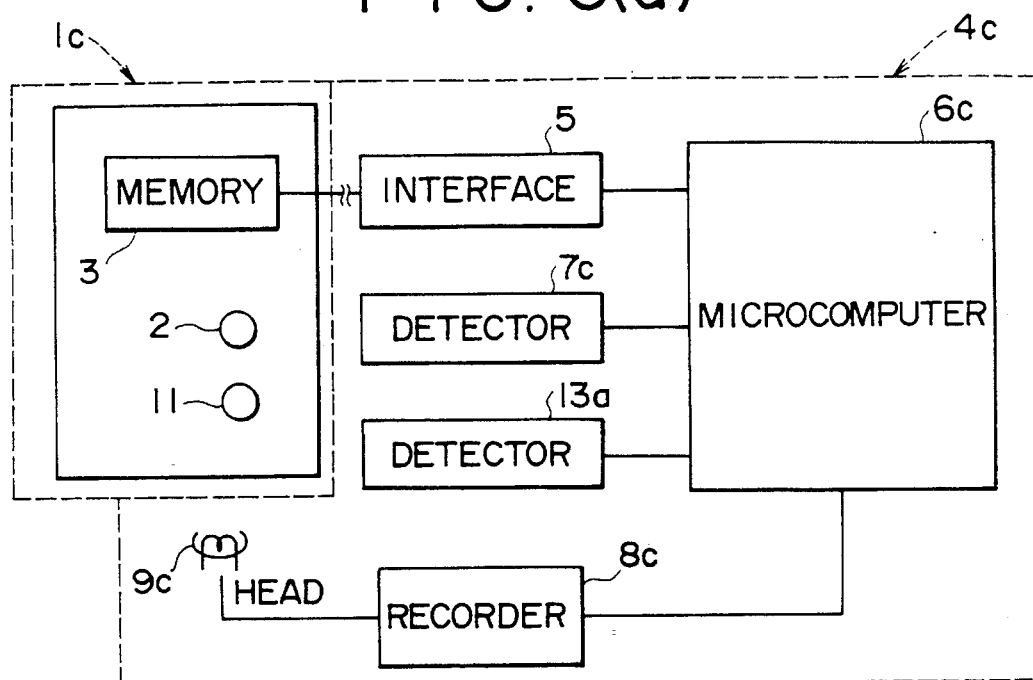
FIGS. 5(a) and 5(b) are block diagrams outlining a relationship between a memory-based recording medium cassette practiced as a second embodiment of the present invention and recording/reproducing apparatuses.
Figure 5B:
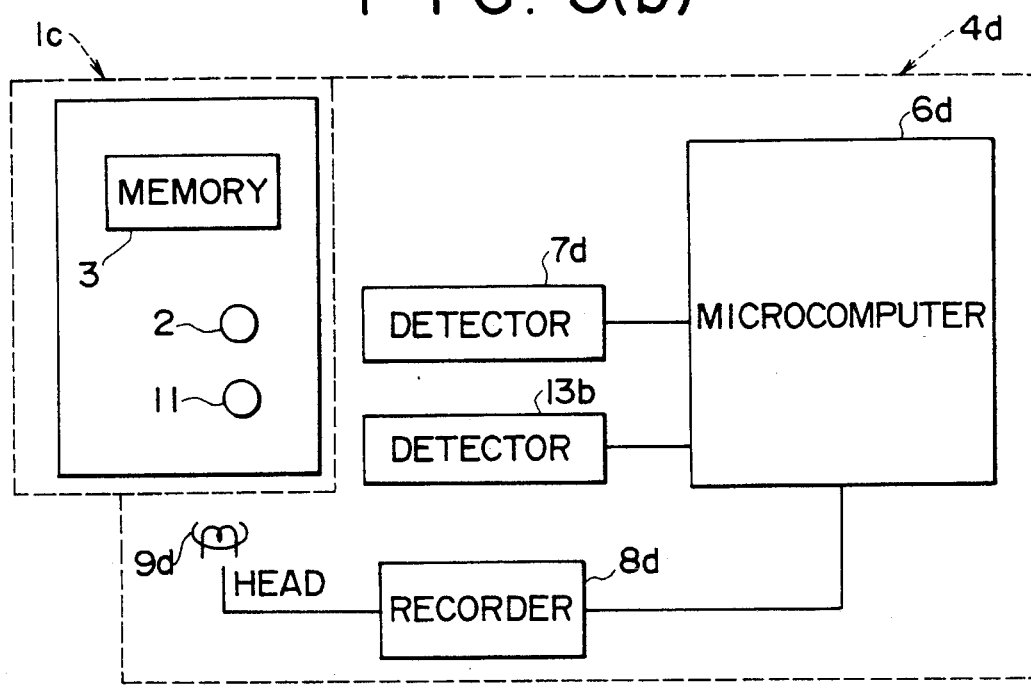

In FIG. 5(a), a recording medium cassette 1c provided with memory has a memory 3, a write-protect hole 2, and a memory detection hole 11. Description of features described above in connection with the above-mentioned first embodiment will be omitted.

Unlike the write-protect hole 2 of the first embodiment, the memory detection hole 11 serves to indicate whether or not the recording medium cassette is provided with memory.

Figure 6:
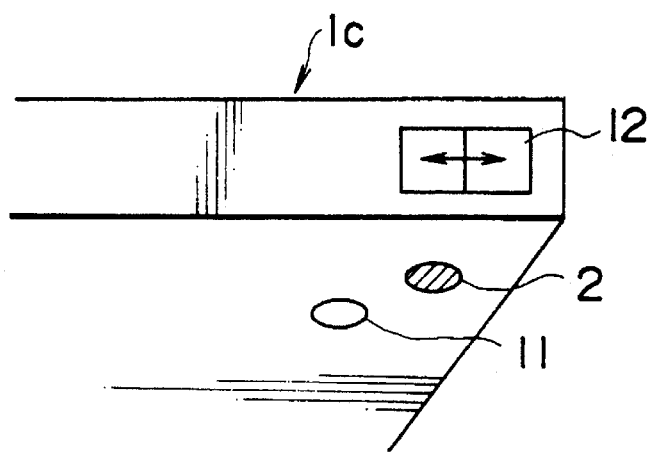
FIG. 6 is a diagram illustrating enabling/disabling means for enabling/disabling data recording on the memory-based recording medium cassette of FIG. 6.

To be specific, in FIG. 6, the memory detection hole 11 of the recording medium cassette 1c provided with memory is disposed near the write-protect hole 2 of the recording medium cassette 1 for example. The memory detection hole 11, which is open from the beginning, indicates that the cassette is provided with memory. The write-protect hole 2 is provided with a slidable tab, in contrast to the write-protect hole of the first embodiment.

Figure 7:
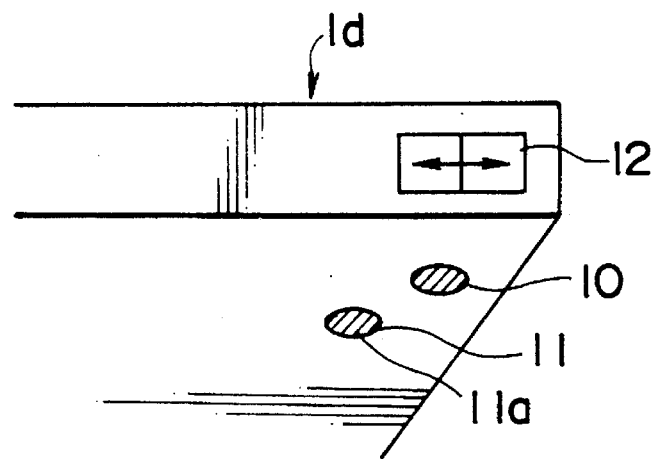
FIG. 7 is a diagram illustrating enabling/disabling means for enabling/disabling data recording on a recording medium cassette having no memory.

In FIG. 7, a memory detection hole 11 of a recording medium cassette 1d provided with no memory is closed with a tab 11a from the beginning. This closure indicates that the cassette is provided with no memory. A write-protect hole 10 of this cassette is provided with a slidable tab like the write-protect hole of the first embodiment.

Meanwhile, as FIG. 5(a) shows, a recording/reproducing apparatus 4c comprises a microcomputer 6c, a detector 7c for detecting whether a recording medium cassette is enabled or disabled for recording, a recorder 8c for recording through a head 9c, a memory detector 13a, and an interface 5 for communication with memory.

The memory detector 13a detects the state of the memory detection hole 11, or determines whether or not the recording medium cassette is provided with memory. This memory detector 13a is provided separately from the detector 7c for determining whether recording of data is enabled or disabled.

A recording/reproducing apparatus 4d incompatible with the memory-based recording medium cassette comprises a microcomputer 6d, a detector 7d for detecting whether a recording medium cassette is enabled or disabled for recording, a recorder 8d for recording through a head 9d, and a memory detector 13b.

Figure 8:
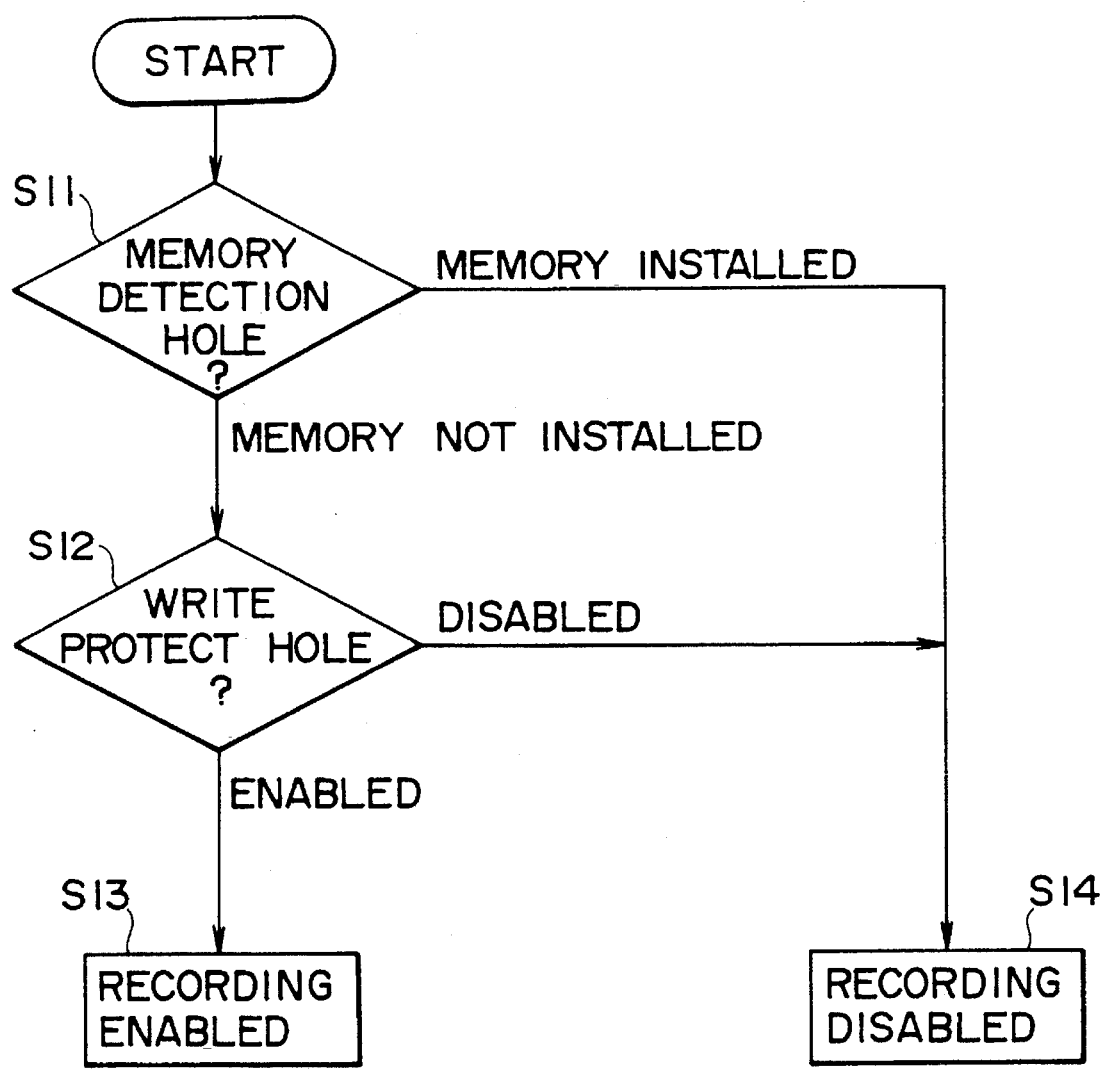
FIG. 8 is a flowchart illustrating an operation to be performed when the memory-based recording medium cassette or the recording medium cassette having no memory has been loaded in the recording/reproducing apparatus incompatible with the memory-based cassette.

In FIG. 8, when the recording medium cassette 1c provided with memory or the recording medium cassette 1d provided with no memory is loaded in the recording/reproducing apparatus 4d incompatible with memory, the memory detection hole 11 is first detected (step S11). If the recording medium cassette is found to have memory, the recording/reproducing apparatus unconditionally disables data recording regardless of the state of write-protect holes 2 and 10 of the recording medium cassette (step S14).

When the recording medium cassette 1d provided with no memory is loaded, the recording/reproducing apparatus disables or enables data recording according to the state of the write-protect hole. That is, if the write-protect hole is found at step S12, recording is disabled (step S14); if the write-protect hole is not found at step S12, recording is enabled (step S13).

The recording/reproducing apparatus 4c compatible with the memory-based recording medium cassette can also check for the memory as mentioned above without using the memory detection hole 11. That is, the recording/reproducing apparatus sends a data read instruction to the cassette. Then, if data are returned in response to the instruction, the apparatus determines that the cassette has the memory; if data are not returned, the apparatus determines that the cassette has no memory.

Figure 9:
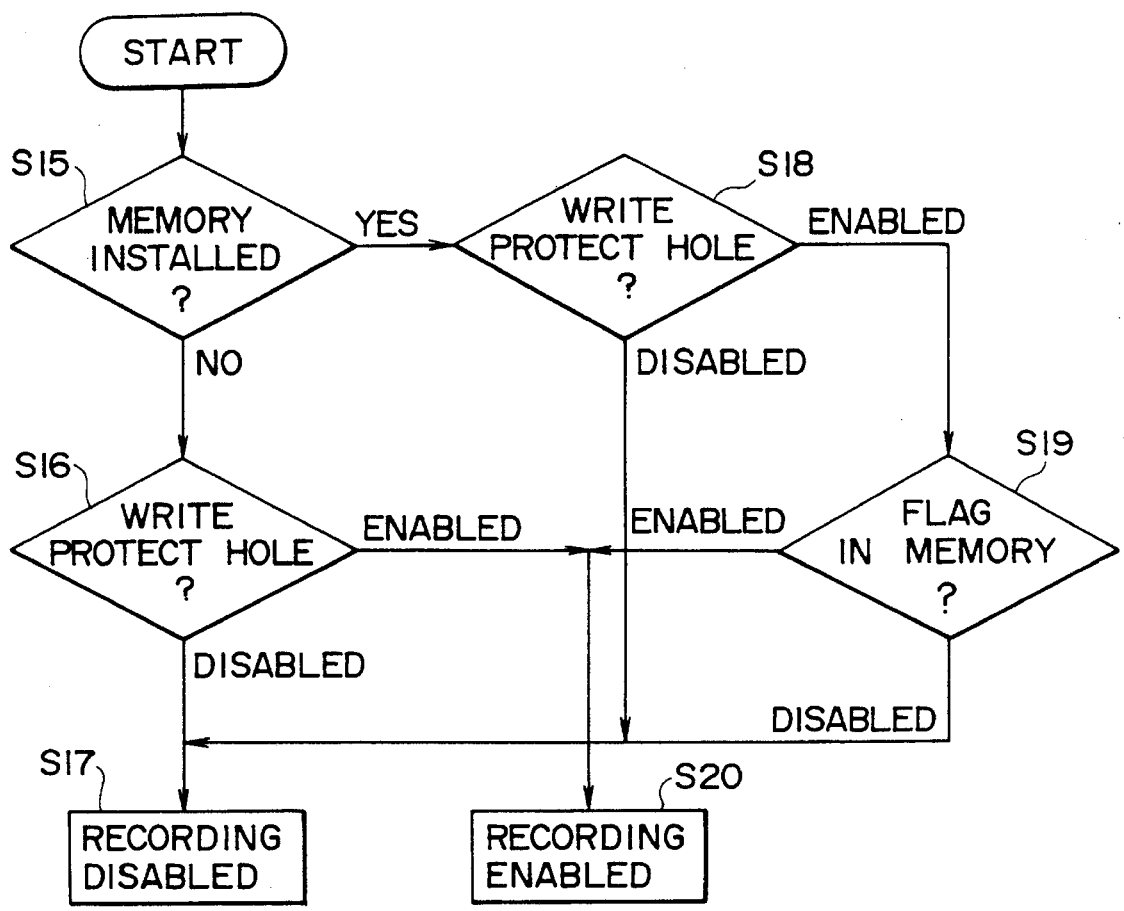
FIG. 9 is a flowchart describing an operation to be performed when a recording medium cassette practiced as the second embodiment of the present invention has been loaded in a recording/reproducing apparatus.

In FIG. 9, the recording/reproducing apparatus 4c compatible with the memory-based recording medium cassette first checks the recording medium cassette for memory (step S15). If the cassette is found to have memory, the recording/reproducing apparatus detects the state of the write-protect hole 2 of the recording medium cassette 1c (step S18). If the state of the write-protect hole 2 is found in the recording enabled state, the recording/reproducing apparatus reads recording information from the memory 3 of the cassette 1 to determine whether a recording flag is enabled or disabled for recording (step S19).

If the recording flag is found enabling, it is ready to record data on the recording medium of the cassette 1 (step S20). If the recording flag is found disabling, recording is disabled at step S17 despite the determination of the state of the write-protect hole 2 at step S18.

Meanwhile, if the write-protect hole 2 is not detected at step S18, the recording/reproducing apparatus determines that recording is disabled, unconditionally putting the cassette in the recording disabled state at step S17. In contrast to the first embodiment, the determination of the state of the write-protect hole is preferred to the recording disable/enable flag.

If step S15 if the cassette is found to have no memory, or the recording medium cassette 1d provided with no memory has been loaded, the recording/reproducing apparatus checks the state of the write-protect hole (step S16). If the write-protect hole is found disabling, the recording/reproducing apparatus puts the cassette in the recording disabled state (step S17); if not, the recording/reproducing apparatus puts the cassette in the recording enabled state (step S20).

In the cases described so far, loading the memory-based recording medium cassette into the recording/reproducing apparatus incompatible with the memory-based recording medium cassette automatically disables data recording. A third embodiment of this invention, however, is provided with means for storing data (a tape content rewrite flag) in the memory of the recording medium cassette 1. This data indicates, when the memory-based recording medium has been loaded in the recording/reproducing apparatus incompatible with such a cassette, that there is a mismatch between recording information stored in the memory and data recorded on the recording medium of the cassette.

Figure 11:
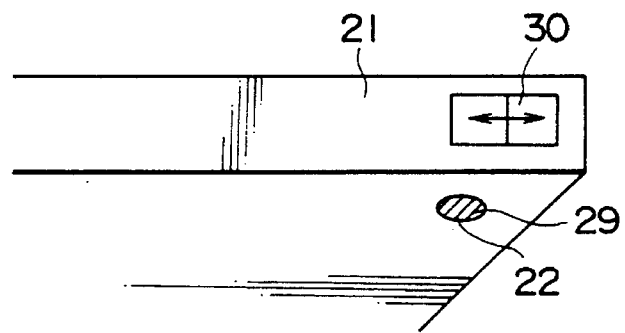
FIG. 11 is a diagram of the memory-based recording medium cassette and the recording medium cassette having no memory of FIG. 10.

In the third embodiment, shown in FIG. 11, the memory-based recording medium cassette and the recording medium cassette having no memory have the same constitution; that is, each comprises a cassette case 21, a write-protect hole 22, a slidable lug 30, and a tab 29 operatively associated with the slidable lug 30.

Figure 10:
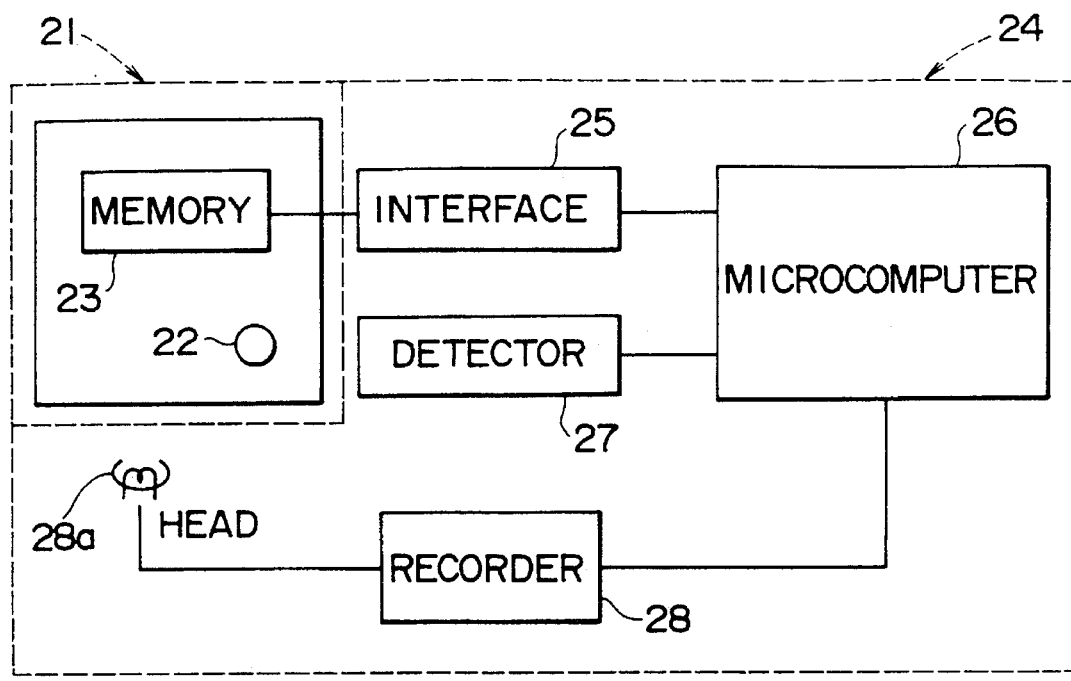
FIG. 10 is a diagram of a recording/reproducing apparatus compatible with a memory-based recording medium cassette and a recording/reproducing apparatus incompatible with the memory-based cassette practiced as a third embodiment of this invention.

In FIG. 10, a recording/reproducing apparatus compatible with the memory-based recording medium cassette and a recording/reproducing apparatus incompatible with the memory-based cassette have the same constitution; that is, each comprises an interface 25, a detector 27, a recorder 28 that records through a head 28a, and a microcomputer 26. However, in the recording/reproducing apparatus incompatible with the memory-based cassette, the microcomputer 26 is provided with a capability for rewriting a particular area in the memory of the memory-based cassette. In the recording/reproducing apparatus compatible with the memory-based cassette, the microcomputer 26 is provided with a capability for rewriting the entire memory area of the memory-based cassette.

In FIG. 12, when the memory-based cassette is loaded in the recording/reproducing apparatus incompatible with such a cassette, the recording/reproducing apparatus first checks the cassette for memory (step S21). The determination whether or not the cassette is provided with memory is done in the same way as in the second embodiment and therefore need not be described again.

If the cassette is found to have memory, the recording/reproducing apparatus checks the write-protect hole 22 (step S22) of the cassette to determine its state. If the write-protect hole 22 is detected or is found open, it indicates that the recording of data on the cassette is disabled, and the cassette is put in the recording disabled state (step S25). If, on the other hand, the write-protect hole 22 is not detected or is found closed, it indicates that data recording is enabled. In this case, the recording/reproducing apparatus at step S23 sets the tape content rewrite flag which indicates a mismatch between recording information stored in a memory 23 of the memory-based recording medium cassette 1 and data recorded on the recording medium of the cassette and then puts the cassette in the recording enabled state (step S26).

If at step S21 the cassette is found to have no memory, the recording/reproducing apparatus checks the write-protect hole 22 of the recording medium cassette to determine its state (step S24). If the write-protect hole 22 is not detected, it indicates that data recording is enabled, putting the cassette in the recording enabled state (step S26). If the write-protect hole 22 is detected, it indicates that data recording is disabled, putting the cassette in the recording disabled state (step S25).

Thus, even the recording/reproducing apparatus incompatible with the memory-based recording medium cassette can record data on the recording medium of the memory-based recording medium cassette. By setting the tape content rewrite flag in the memory, a mismatch, if any, between the data recorded on the recording medium and the recording information stored in the memory can be identified later.

That is, when the recording medium cassette provided with the memory containing such a mismatching information is later loaded in the recording/reproducing apparatus compatible with the memory-based recording medium cassette, the tape content rewrite flag indicating the mismatch is first read and displayed, informing a user thereof very easily.

Figure 13:
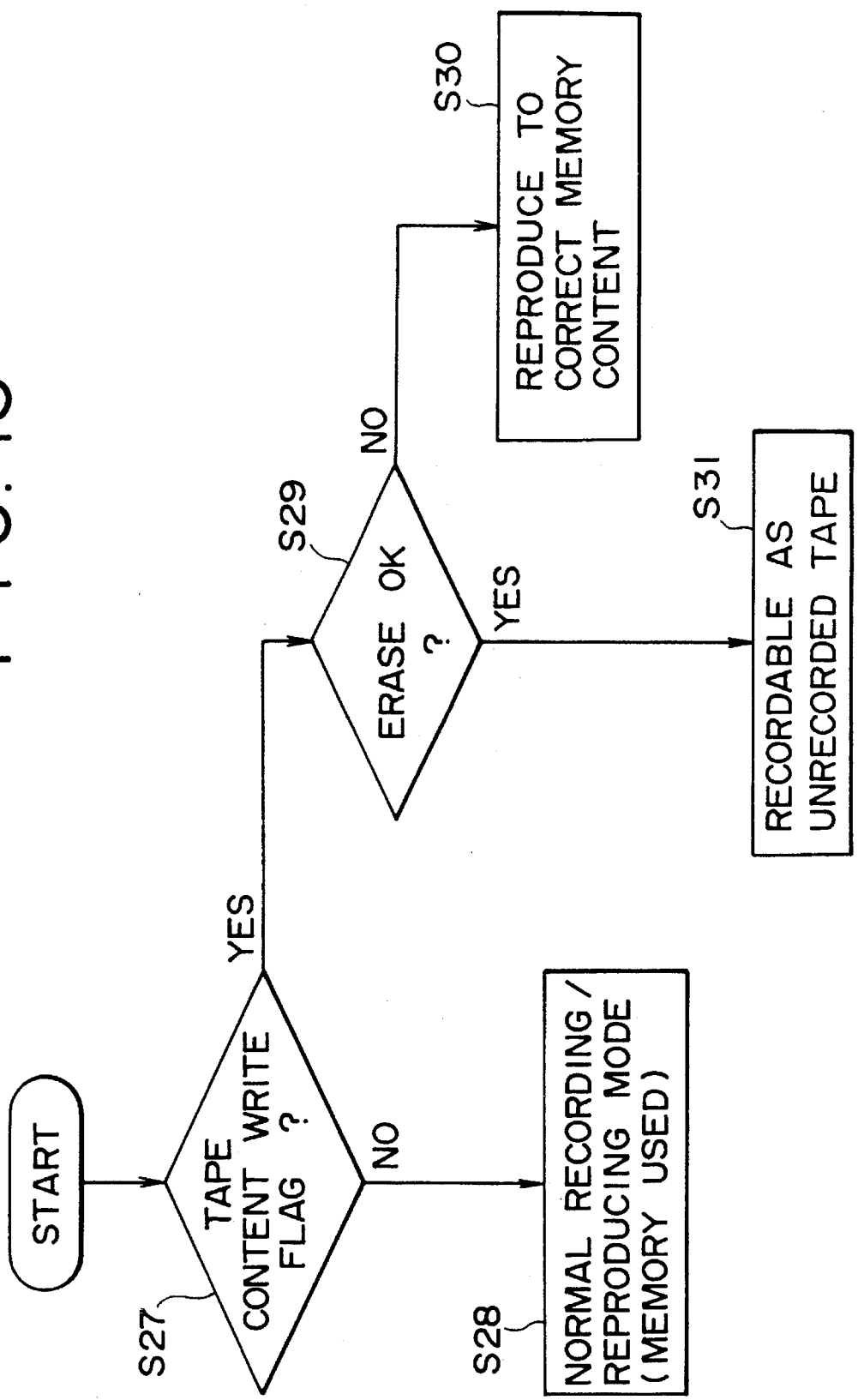
FIG. 13 is a flowchart illustrating an operation to erase or not to erase the recorded data depending on a tape content rewrite flag.
Figure 14:
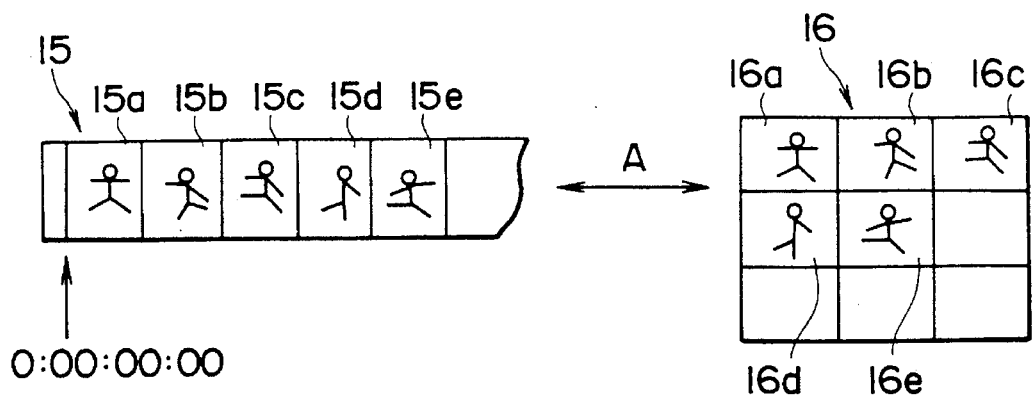
FIG. 14 is a diagram illustrating a complete correlation between recording information stored in memory of a memory-based recording medium cassette and data recorded on the cassette played on a recording/reproducing apparatus compatible with the cassette in a prior-art setup.
Figure 15:
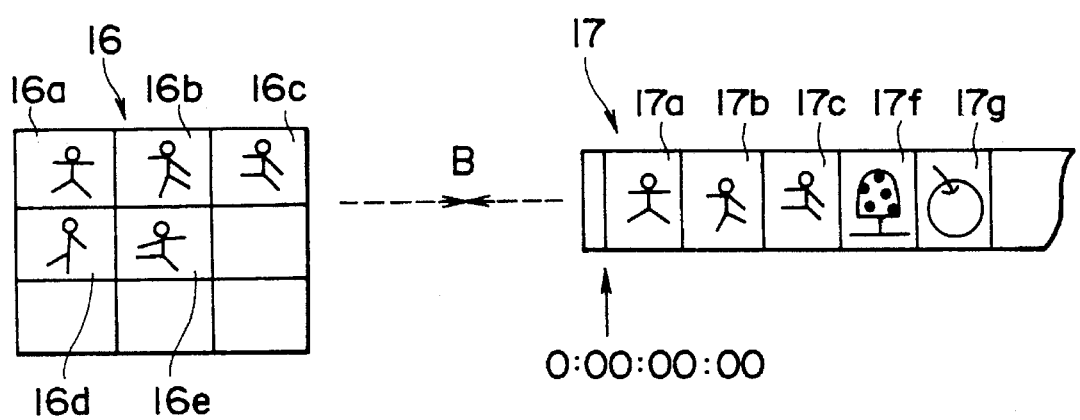
FIG. 15 is a diagram illustrating an incomplete correlation between recording information stored in memory of a memory-based recording medium cassette and data recorded on the cassette played on a recording/reproducing apparatus incompatible with the cassette in a prior-art setup.
Figure 16:
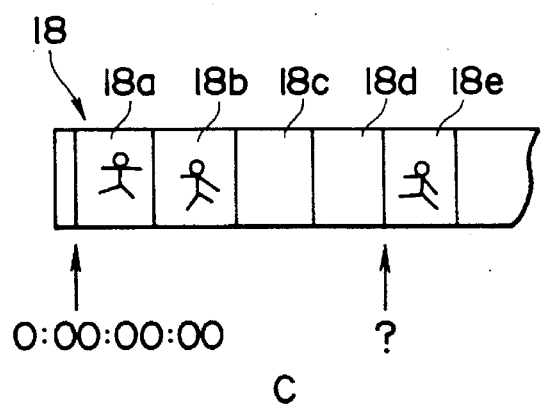
FIG. 16 is a diagram illustrating that there is no problem of mismatch between recording information and data recorded on a recording medium cassette in a case where the cassette has no memory.
Figure 17:
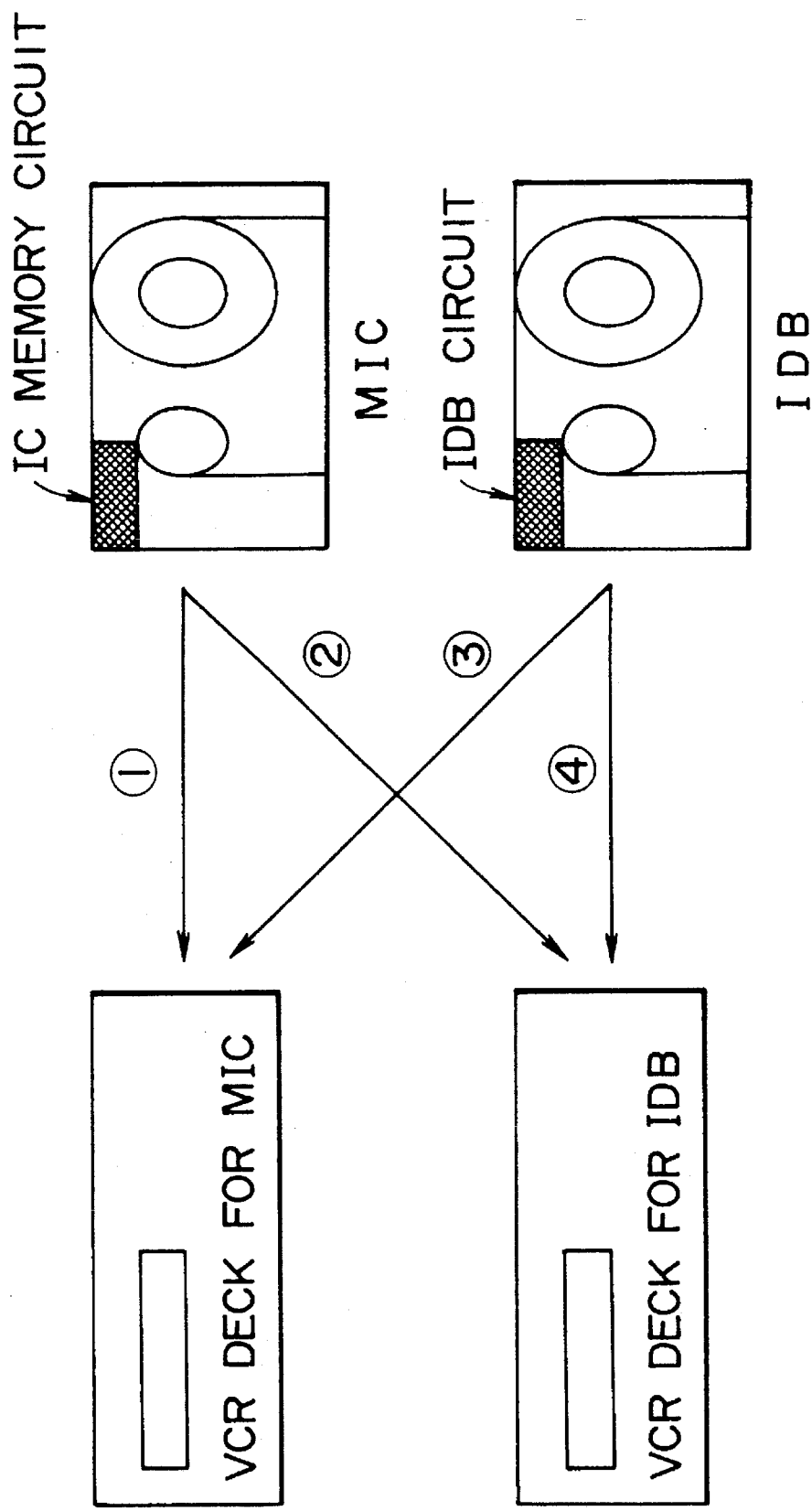
FIG. 17 is a diagrammatic representation of the relationship between either of two VCR decks and either of two cartridges, one cartridge having an IC memory circuit (MIC cassette) and the other having an identifying board or IDB circuit (IDB cassette)
Figure 18:
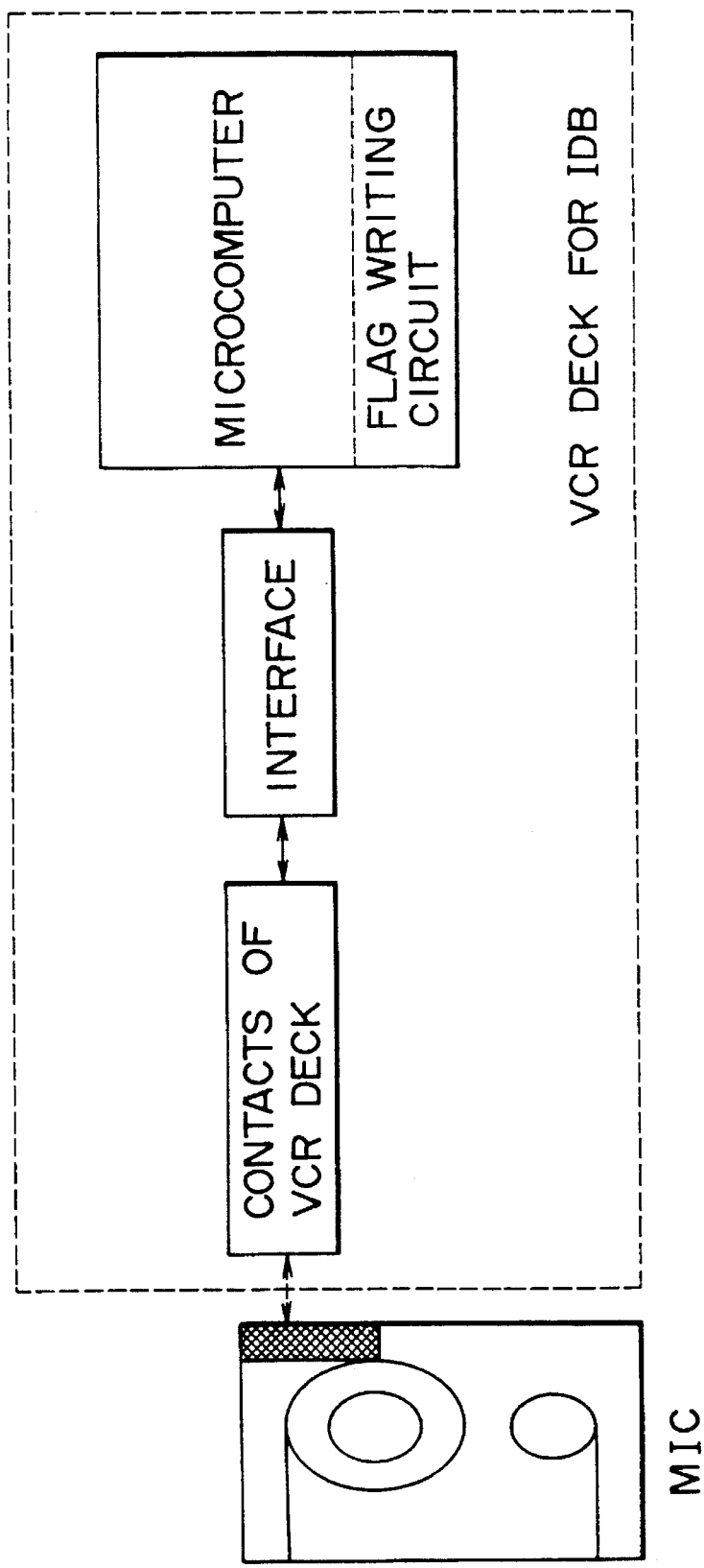
FIG. 18 is a block diagram of a VCR deck for an IDB cassette.

To be more specific, in FIG. 13, if at step S27 the tape content rewrite flag indicates rewritten data, it shows that there is no correlation between the recording information stored in the memory and the data recorded on the recording medium, and the recording/reproducing apparatus asks the user whether the recorded data is to be erased (step S29). If the recorded data is to be erased, the cassette containing it becomes recordable as an unrecorded cassette (step S31). If the recorded data is not to be erased, the cassette may be reproduced to correct the information in the memory (step S30). If at step S27 it is determined that the tape content rewrite flag is not set, the recording/reproducing apparatus realizes that there is no mismatch between the recording information stored in the memory of the recording medium cassette and the data recorded on its recording medium and enters a normal memory-based recording/reproducing mode (step S28).

Accordingly, previously breaking the recording enable/disable tab provided on the memory-based recording medium cassette prevents data recorded on the cassette from being written over and ensures that there will be no mismatch between the recording information stored in the memory of the cassette and the data recorded on the recording medium of the cassette.

Providing the recording medium cassette having no memory with the slidable recording enable/disable tab disallows easy rewriting of recorded data when the recording medium cassette having no memory is loaded in the recording/reproducing apparatus compatible with the memory-based recording medium cassette.

Providing a write-protected data area in the memory of the memory-based recording medium cassette and disabling data writing based on the data in the write-protected data area makes it possible to partially rewrite the recorded data by disabling data recording even if data recording is enabled by the detection hole.

Providing a recording medium cassette with detecting means for checking the cassette for memory prevents an inadvertent recording even on the recording/reproducing apparatus incompatible with the memory-based recording medium cassette.

Providing the memory of the memory-based recording medium cassette with an area in which to save the flag indicating a mismatch between the recording information stored in the memory and the data recorded on the recording medium of the cassette facilitates detection of the mismatch.

While the preferred embodiments of the invention have been described using specific terms, such description is for illustrative purpose only, and it is to be understood that changes and variations may be made without departing from the spirit or scope of the appended claims.

What is claimed is:

1. Apparatus for securing data recorded on a recording medium housed in a cassette wherein said cassette is provided with data recording enable/disable means for enabling and disabling recording on said recording medium and may or may not be provided with a memory for storing information about data recorded on said recording medium, said apparatus comprising:

recording means;

state detecting means for producing a state detection signal representing the state of said enable/disable means;

memory detecting means for producing a memory detection signal representing a presence or an absence of a memory in said cassette; and microcomputer means for disabling recording by said recording means in response to a memory detection signal indicating the presence of a memory in said cassette;

disabling of recording by said recording means in response to a memory detection signal indicating the absence of a memory in said cassette and a state detection signal indicating that said enable/disable means is in a disable state; and enabling recording by said recording means in response to a memory detection signal indicating the absence of a memory in said cassette and a state detection signal indicating that said enable/disable means is in an enable state.

2. A method of securing data recorded on a recording medium housed in a cassette wherein a memory flag having an enable/disable state is provided and said cassette is provided with data recording enable/disable means for enabling and disabling recording on said recording medium and may or may not be provided with a memory for storing information about data recorded on said recording medium, said method comprising the steps of:

detecting a presence or an absence of a memory;

detecting the state of said enable/disable means;

disabling recording on said recording medium in response to detecting the absence of a memory and a disable state of said enable/disable means;

disabling recording on said recording medium in response to detecting the presence of a memory and a disable state of said enable/disable means;

disabling recording on said recording medium in response to detecting the presence of a memory, an enable state of said enable/disable means, and a disable state of said memory flag;

enabling recording on said recording medium in response to detecting the absence of a memory and an enable state of said enable/disable means; and enabling recording on said recording medium in response to detecting the presence of a memory, an enable state of said enable/disable means, and an enable state of said memory flag.

* * * * *